United States Patent
Beidas et al.

(10) Patent No.: US 6,263,031 B1
(45) Date of Patent: Jul. 17, 2001

(54) METHOD AND APPARATUS FOR SIGNAL BURST CLASSIFICATION

(75) Inventors: Bassel F. Beidas, Alexandria, VA (US); A. Roger Hammons, Jr., North Potomac; Yezdi F. Antia, Gaithersburg, both of MD (US)

(73) Assignee: Hughes Electronics Corp., El Segundo, CA (US)

( * ) Notice: Subject to any disclaimer, the term of this patent is extended or adjusted under 35 U.S.C. 154(b) by 0 days.

(21) Appl. No.: 09/109,799

(22) Filed: Jul. 2, 1998

Related U.S. Application Data

(60) Provisional application No. 60/083,481, filed on Apr. 29, 1998, and provisional application No. 60/083,475, filed on Apr. 29, 1998.

(51) Int. Cl.[7] ............................................. H04L 27/06
(52) U.S. Cl. .......................... 375/343; 375/142; 370/320
(58) Field of Search ........................... 375/343, 90, 142; 370/206, 320; 342/90; 364/604, 487

(56) References Cited

U.S. PATENT DOCUMENTS

| | | | |
|---|---|---|---|
| 4,007,331 | * 2/1977 | Flanagan | 178/88 |
| 4,450,531 | * 5/1984 | Kenyon et al. | 364/604 |
| 4,843,562 | * 6/1989 | Kenyon et al. | 364/487 |
| 5,117,441 | * 5/1992 | Weitgand | 375/90 |
| 5,210,820 | * 5/1993 | Kenyon | 395/2 |
| 5,561,431 | * 10/1996 | Peele et al. | 342/90 |
| 5,577,056 | * 11/1996 | Malik et al. | 371/57.2 |
| 5,696,762 | * 12/1997 | Natali et al. | 370/320 |
| 5,809,009 | * 9/1998 | Matsuoka et al. | 370/206 |
| 5,991,632 | * 11/1999 | Guillame | 455/466 |
| 6,067,295 | * 5/2000 | Taubenheim et al. | 375/316 |
| 6,128,331 | * 10/2000 | Struhsaker et al. | 375/142 |

* cited by examiner

*Primary Examiner*—Stephen Chin
*Assistant Examiner*—Tony Al-Beshrawi
(74) *Attorney, Agent, or Firm*—John T. Whelan; Michael W. Sales

(57) ABSTRACT

A burst classifier is useful in a digital communication system transmitting a signal burst of a plurality of different burst types. The burst classifier includes a plurality of filters associated with the plurality of different burst types, respectively. Each filter generates correlation data based on the signal burst and a respective plurality of reference signals offset by a plurality of time offsets. The respective pluralities of reference signals are indicative of a corresponding burst type of the plurality of different burst types. A comparator then analyzes quantities based on the correlation data from each filter to determine the burst type of the signal burst.

30 Claims, 9 Drawing Sheets

METHOD AND APPARATUS FOR SIGNAL BURST CLASSIFICATION

RELATED APPLICATIONS

This application is based on and claims benefit from two provisional applications entitled "Efficient Method of Joint Timing Synchronization and Frequency Offset Estimation" and "Robust Method of Information Burst Type Classification," both of which were filed on Apr. 29, 1998, and respectively accorded Ser. Nos. 60/083,481 and 60/083,475.

BACKGROUND OF THE INVENTION

1. Field of the Invention

The invention relates generally to digital communication systems and, more particularly, to systems utilizing reference symbols to assist in the demodulation of transmitted information.

2. Description of the Related Art

Digital communication systems typically utilize bandwidth-efficient modulation schemes to maintain high bit rates for a number of user channels. Such systems transmit bursts of information symbols that may include both reference symbols and data symbols. The reference symbols are known by a receiver to assist in the demodulation of the data symbols.

Some signal bursts are designed to provide control information only. For instance, FACCH (fast access control channel), SDCCH (stand-alone dedicated control channel), and SACCH (slow associated control channel) bursts provide messaging information for upper layer protocols. These and other types of signal bursts are to be distinguished from data bursts that carry voice and/or other data information, such as TCH (normal traffic channel) and RACH (random access channel) bursts. In order to benefit from these different types of bursts, the receiving portion of the communication system must be capable of distinguishing between burst types. Past systems have classified incoming bursts by devoting a portion of a preamble segment to identification data.

In order to demodulate the identification data (and the rest of the data contained in the signal burst), the clock in the receiver must be synchronized with the clock in the transmitter and, further, the oscillator in the receiver must be aligned with the actual frequency of the carrier signal. With certain modulation schemes (e.g., QPSK), the receiver is capable of deriving timing and frequency information from the information symbols themselves subsequent to removing the modulation. These conveniences are not available with modulation schemes such as GMSK (Gaussian Minimum Shift Keying), in which modulated information is transmitted over a plurality of bit periods, inasmuch as no single non-linearity exists for modulation removal. However, such memory-inducing modulation schemes provide several advantages, not the least of which is the constant envelope of the transmitted signal. This advantage is particularly useful for satellite communication systems, inasmuch as cheaper Class C amplifiers may be used in both the satellites and the receivers.

In past systems utilizing memory-inducing modulation schemes, the preamble segment of each signal burst also included portions for estimating the timing and frequency of the signal burst. For the timing variable, a first portion provided reference symbols having considerable variation such that the transmitted signal has high frequency components. A second portion provided symbols all set to "1" to obtain high resolution for the frequency variable. However, evaluation of these portions of the preamble became an undesirable prerequisite to burst type classification. Moreover, allocating separate bits to timing and frequency estimation as well as burst type classification has limited the data throughput of such systems.

SUMMARY OF THE INVENTION

The present invention is useful in a digital communication system transmitting a signal burst of a plurality of different burst types. According to one aspect of the present invention, a burst classifier includes a plurality of filters associated with the plurality of different burst types, respectively. Each filter generates correlation data based on the signal burst and a respective plurality of reference signals offset by a plurality of time offsets. The respective pluralities of reference signals are indicative of a corresponding burst type of the plurality of different burst types. The burst classifier further includes a comparator that analyzes quantities based on the correlation data from each filter to determine the burst type of the signal burst.

According to another aspect of the present invention, a method of classifying a signal burst as one of a plurality of burst types transmitted in a digital communication system includes the step of calculating correlation data based on the signal burst and a respective plurality of reference signals offset by a plurality of time offsets. The respective pluralities of reference signals are indicative of a corresponding burst type of the plurality of different burst types. The inventive method further includes the step of comparing quantities based on the correlation data to determine the burst type of the signal burst.

According to yet another aspect of the present invention, a method is useful for classifying a signal burst modulated by a modulation scheme that induces memory therein as one of a plurality of burst types transmitted in a digital communication system. The inventive method includes the step of comparing the signal burst with a respective plurality of reference signals to generate comparison data not reflecting the memory induced by the modulation scheme. The respective pluralities of reference signals are indicative of a corresponding burst type of the plurality of different burst types. The inventive method further includes the step of combining the comparison data non-coherently over a plurality of reference segments distributed within the signal burst to generate combined comparison data for each of a plurality of time offsets and for each burst type. The inventive method still further includes the step of removing uncertainty associated with a timing offset of the signal burst by generating a maximum comparison value for each burst type from the combined comparison data for the plurality of time offsets. Lastly, the inventive method includes the step of determining the burst type of the signal burst from the maximum comparison values.

DETAILED DESCRIPTION OF THE INVENTION

The present invention provides an apparatus and method for classifying incoming bursts having reference symbols. To this end, the different burst types include distinguishable reference symbols distributed throughout the burst. The present invention provides a technique for classifying the burst without knowledge of the noise and signal levels, or the timing, carrier phase, frequency, or channel fading conditions.

Figure 1:
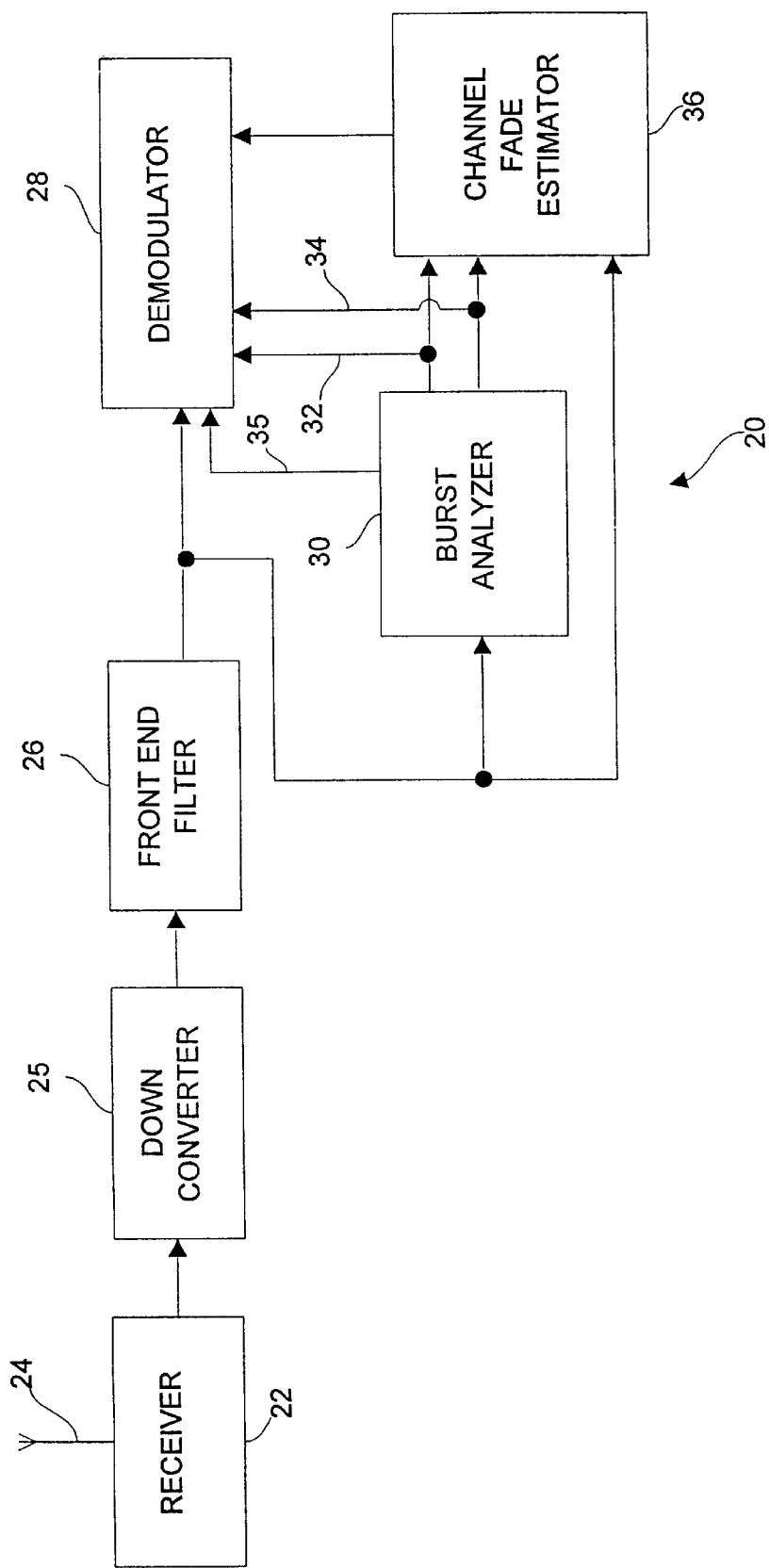
FIG. 1 is a diagram of a receiving portion of a digital communication system in accordance with one embodiment of the present invention.

Referring to FIG. 1, a digital communication system 20 includes a receiver 22 and an antenna 24 for receiving a signal transmitted from another portion (not shown) of the digital communication system 20. The received signal is down-converted by a down-converter 25 and then filtered by a front end filter 26, which may be a pass band filter for removing any out-of-band frequencies and re-developing the baseband signal. The received baseband signal (hereinafter referred to for simplicity as "the received signal") is then provided to a demodulator 28 and a burst analyzer 30. In order to demodulate the received signal accurately, the demodulator 28 receives on lines 32, 34, and 35 a timing synchronization signal $t_{SYNCH}$, a frequency offset signal $f_{OFFSET}$, and a burst classification signal, respectively, each of which is generated by the burst analyzer 30 as set forth hereinbelow. The demodulator 28 includes a clock (not shown) and an oscillator (not shown) that utilize the timing and frequency signals, respectively, to accurately demodulate the received signal. The demodulator 28 may include multiple demodulator components (not shown) for each burst type. The burst classification signal is utilized by the demodulator 28 to determine which component is appropriate for demodulating the received signal. However, different burst types may be modulated according to the same modulation scheme and, therefore, may utilize the same demodulator component. The timing synchronization signal and the frequency offset signal are also provided to a channel fade estimator 36, which is also coupled to the front end filter 26 for provision of the received signal. As is known to those skilled in the art, the channel fade estimator 36 tracks the channel complex gain resulting from channel fading, and provides that information to the demodulator for compensation.

The digital communication system 20 may, for example, transmit a time-division multiplexed access (TDMA) signal for accommodating a number of users. TDMA and other systems known to those skilled in the art may transmit a plurality of different types of signal bursts to provide control information as well as voice, data, or other information. For instance, prior to transmission of any voice information, a typical TDMA system may transmit a random access channel (RACH) burst that provides the receiving portion of the digital communication system 20 with rough estimates (i.e., ranges) of the timing and frequency of the subsequent signal bursts. In general, however, it will be appreciated that a variety of techniques for providing rough estimates of both timing and frequency are known to those skilled in the art. Accordingly, the method and apparatus of the present invention should not be limited to digital communication systems utilizing a particular multiplexing scheme.

The digital communication system 20 may comprise a mobile satellite communication system. However, the present invention is more generally applicable to any communication system in which multiple types of signal bursts are transmitted. The invention is particularly applicable to those wireless communication systems in which the timing and frequency of the signal burst are unknown at the receiving portion of the system 20, such as those systems transmitting a constant envelope signal (or a signal with memory).

In general, the digital communication system 20 may utilize a variety of different bandwidth-efficient modulation schemes. The present invention is particularly useful with the modulation scheme specified by a typical mobile satellite communication system, which transmits a Gaussian Minimum Shift Keyed (GMSK) signal burst, $\tilde{s}(t)$, defined in complex form as:

$$\tilde{s}(t) = Re\{\tilde{s}_{GMSK}(t-\epsilon T)e^{j(2\pi\Delta ft+\theta_c)}\}$$

where $\epsilon$ represents the timing offset introduced during transmission (normalized by the symbol period T), $\Delta f$ is the carrier frequency drift introduced by the channel, and $\theta_c$ is the initial carrier phase. The values $\epsilon$ and $\Delta f$ may be derived from the respective signals $t_{SYNCH}$ and $f_{OFFSET}$. The received signal $\tilde{s}(t)$ may have a 3 dB bandwidth B normalized by a symbol period T (i.e., the bandwidth-symbol period product BT) of 0.3. It shall be understood, however, that the effectiveness of the present invention is not limited to any particular normalized bandwidth, or any particular channel condition or noise level. For the sake of simplicity only, additive white Gaussian noise (AWGN) has been assumed $\tilde{s}(t)+AWGN$ shall be referred to as $\tilde{r}(t)$ and, thus, the GMSK signal may be set forth as:

$$\tilde{s}_{GMSK}(t) = \sqrt{2S}\exp\left(j\left[\theta_n + \pi\sum_{i=n-L+1}^{n}\alpha_i q(t-iT)\right]\right)$$

for $nT \leq t \leq (n+1)T$, which corresponds to an nth time interval with a duration of one symbol (i.e., bit) period, and where S represents the signal strength or amplitude. The data $\{\alpha_i; i=0, \ldots, (N-1)\}$ comprises a differentially encoded version of an independent and identically distributed binary stream generated at rate $T^{-1}$. A phase pulse q(t) comprises the integral of a modulation pulse g(t), which, in turn, is a Gaussian function convolved with a rectangular pulse. The phase pulse q(t) reaches a final value in a time LT, where L is representative of the memory induced by the GMSK modulation, i.e., the amount to which the modulation distributes a bit over several symbol periods.

The modulating pulse g(t) for the GMSK signal $s_{GMSK}(t)$ may be expressed as:

$$g(t) = \frac{1}{2T}\left[Q\left(2\pi\frac{t-T/2}{\sqrt{\ln 2}}\right) - Q\left(2\pi\frac{t+T/2}{\sqrt{\ln 2}}\right)\right]$$

where Q(x) is a Gaussian probability integral as follows:

$$Q(x) = \frac{1}{\sqrt{2\pi}}\int_x^\infty e^{-\frac{1}{2}y^2} dy$$

The phase value $\theta_n$ represents the accumulation of all of the bits that have reached a final value during the nth time interval [nT, (n+1)T], or $$\theta_n = \frac{\pi}{2}\sum_{i=0}^{n-L} \alpha_i \bmod 2\pi$$

$$= \theta_{n-1} + \frac{\pi}{2}\alpha_{n-L} \bmod 2\pi$$

From the above, it is clear that, in this particular modulation scheme, the phase value $\theta_n$ may take on one of four different values:

$$\theta_n \in \left\{0, \frac{\pi}{2}, \pi, -\frac{\pi}{2}\right\}$$

Figure 2:
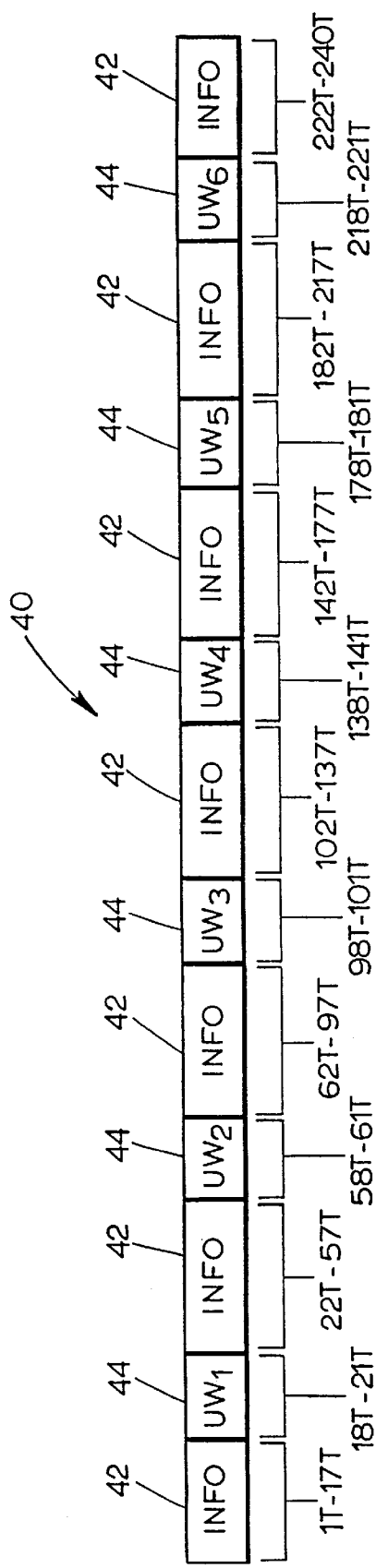
FIG. 2 is a diagram showing an exemplar message format of an information burst transmitted by the digital communication system of FIG. 1.

Referring now to FIG. 2, the received signal comprises a signal burst 40 having a plurality of segments. The signal burst 40 may comprise, for example, a traffic channel burst, and, therefore, include information segments 42 that primarily carry information (i.e., data) bits rather than bits utilized primarily for control purposes. The information segments 42 are separated by a plurality of reference segments 44, each of which carries reference bits utilized by the apparatus and method of the present invention to estimate timing, frequency, and burst type. In accordance with the present invention, the reference segments 44 are distributed throughout the signal burst 40. The signal burst 40 may also include other segments (not shown) that provide, for instance, control information.

The reference segments 44 may, but need not, be distributed uniformally across the signal burst 40 as shown. As distributed, however, each reference segment 44 comprises a unique word (UW) that may be the same as, or different from, the other unique words in the signal burst 40. The data in each unique word, of course, must be predetermined (i.e., known by the receiving portion of the digital communication system 20) to enable recognition thereof.

For the purposes of explanation only, the signal burst 40 is shown to include a total of six unique words distributed over a signal burst having 240 symbols or bits. In accordance with one embodiment of the present invention, these six unique words may each comprise the four bits {−1, −1, 1, −1}, the set of which provides sufficient data variation to enable accurate timing estimation. As shown in FIG. 2, after the first information segment 42, which occupies symbol positions 1T–17T, the first unique word UW₁ is located at time interval 18T–21T. The locations of the other unique words, normalized by the symbol period T, are also set forth in FIG. 2. With each reference segment 44 taking up four bits, the non-terminal (i.e., internal) information segments 42 comprise 40T segments.

In the digital communication system 20 described above, each unique word is provided to the burst analyzer 30 in the form of a reference signal modulated, for example, according to the memory-inducing GMSK modulation scheme.

The modulated reference signal is, therefore, determined at least partially by the in information bits in an adjacent information segment 42 to an extent determined by the normalized bandwidth. With BT=0.3, a reasonable approximation for L is 3, meaning that the three nearest bits to any bit in the unique word will affect the shape of the reference signal at that bit position. Thus, for example, with four bits in each unique word and L=3, it can be shown that the burst analyzer 30 must accommodate a total of eight different reference signal waveforms. However, it shall be understood that additional reference waveforms may be necessary in the event that the unique words in the signal burst 40 are not identical.

Figure 3:
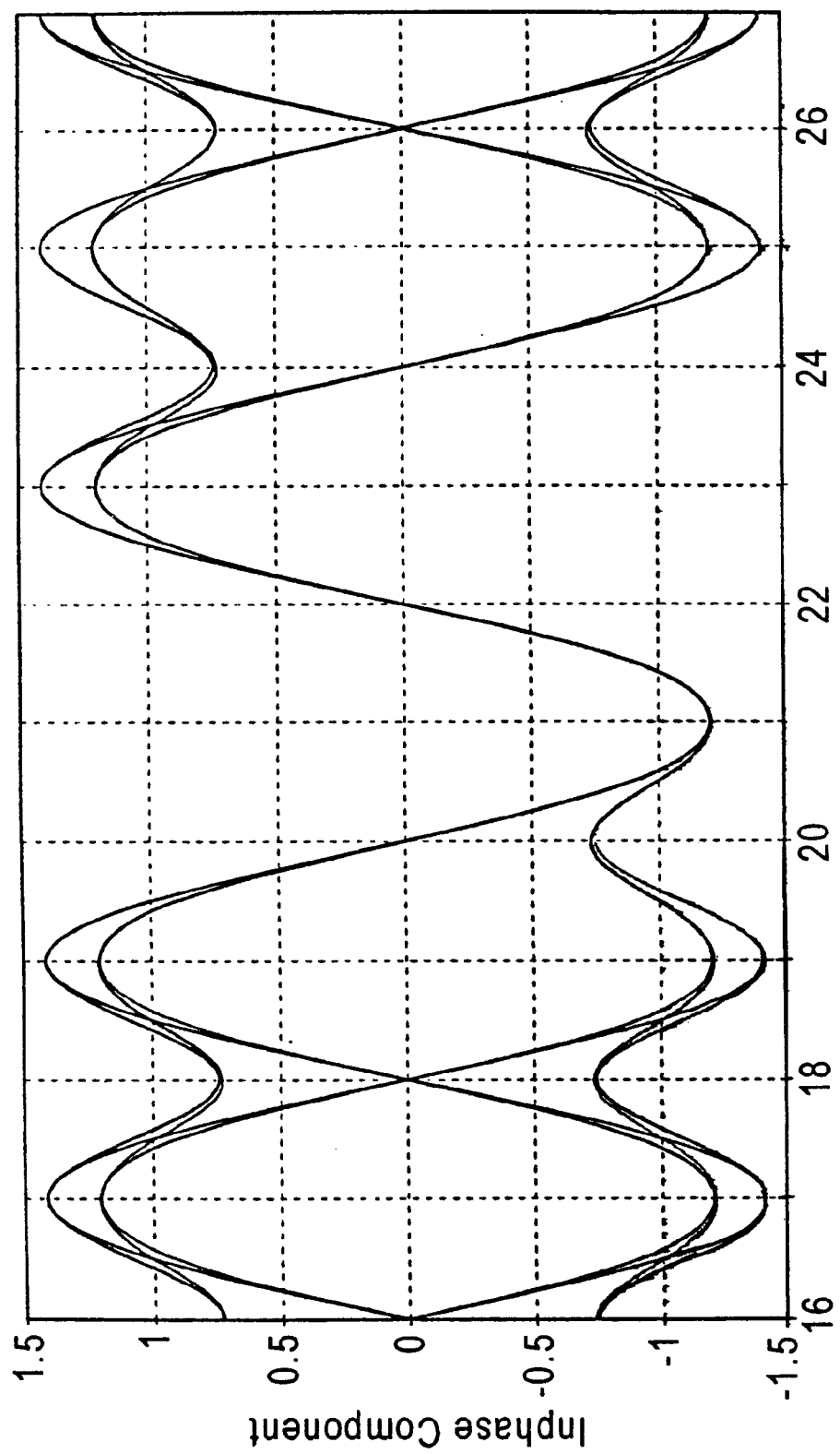
FIG. 3 is an eye pattern diagram showing in-phase components of signal waveforms that may be processed by the receiving portion of the digital communication system of FIG. 1.
Figure 4:
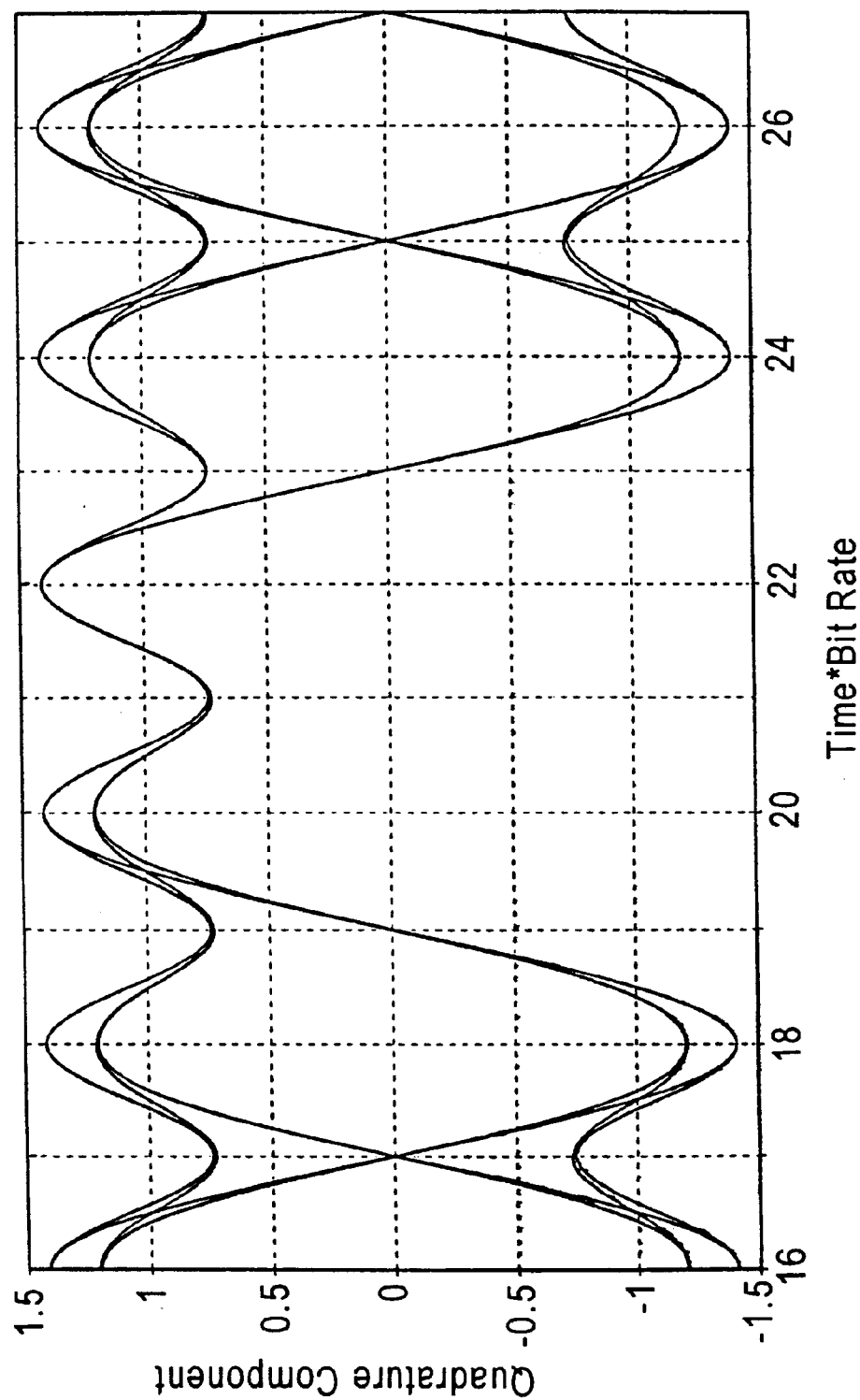
FIG. 4 is an eye pattern diagram showing quadrature components of signal waveforms that may be processed by the receiving portion of the digital communication system of FIG. 1.

FIGS. 3 and 4 illustrate examples of various reference waveforms that may result from the GMSK modulation (with BT=0.3) of the first unique word UW₁ (−1,−1,1, −1) located in the time interval (18T, 21T). As is known to those skilled in the art, in a typical GMSK-modulated signal, even numbered bits are transmitted by the in-phase component, while odd numbered bits are transmitted by the quadrature component. Accordingly, FIG. 3 shows an eye pattern of the in-phase component of the reference waveform versus time (normalized by T), while FIG. 4 shows an eye pattern of the quadrature component. In the embodiment of the present invention utilizing the reference waveforms of FIGS. 3 and 4, the in-phase and quadrature components combine to provide a possibility of eight complex reference waveforms. Reference waveforms, as used hereinbelow, are to be understood to comprise complex waveforms and, thus, both the in-phase and quadrature components.

With continued reference to FIGS. 3 and 4, the least-varying portion of each reference waveform shown is located in the time interval (20T, 24T) for the in-phase component and in the time interval (19T, 23T) for the quadrature component. This approximate two-bit delay may be viewed as being introduced by the Gaussian filtering introduced by the modulation and may be accounted for appropriately by the receiving portion of the system 20, as is well known to those skilled in the art.

In view of the eye patterns of FIGS. 3 and 4, the burst analyzer 30 may compare the received signal with a plurality of possible reference waveforms (e.g., eight) to determine the timing, frequency, and burst type information. This comparison occurs during an observation interval corresponding with the locations of the least-varying portions of the received signal. The burst analyzer 30 may, however, compare the received signal with fewer reference waveforms at the expense of performance degradation. As will be explained further hereinbelow, a reference waveform (i.e., one used by the burst analyzer 30) may be designed to constitute an average of two or more of the possible reference waveforms shown in FIGS. 3 and 4. Thus, in principle, the burst analyzer 30 may compare the received signal with as few as only one reference waveform, which would constitute an average of all of the eight possible reference waveforms, or as many as necessary to achieve a certain performance level.

The observation interval of the burst analyzer 30 need not correspond with the number of bits in a unique word. For example, it can be shown that, if the comparison performed by the burst analyzer 30 is extended to a five bit interval, the burst analyzer 30 may then compare the received signal against sixteen is different reference waveforms (once again, with L=3). Such an extension improves the performance of the present invention without having to devote additional bits to the reference segments 44, thereby maintaining the same data throughput rate. As set forth above, however, the number of reference waveforms compared to the received signal may be reduced by averaging two or more of the sixteen reference waveforms to reduce computation times and/or system complexity. Eye patterns similar to those shown in FIGS. 3 and 4 may be used to decide which reference waveforms should be averaged.

The determination of the timing and frequency of the signal burst will now be described in connection with FIG. 5, which shows the burst analyzer 30 in greater detail. Heavier (wider) lines indicate transmission of signals representative of complex values, while more narrow lines indicate transmission of signals representative of real values. The received signal $\tilde{r}(t)$ is provided to a matched filter bank 50 comprising a plurality of matched filters 52 (FIG. 6). The number of matched filters 52 corresponds with the number of reference waveforms N that are to be compared with the received signal. The number of reference waveforms N, in turn, corresponds with the size of the set of differentially encoded data $\{\alpha_i; i=0, \ldots, N-1)\}$, which may be denoted by $\alpha$. As shown in FIG. 6, if M defines the number of symbol or bit periods in an observation (or correlation) interval, then the received signal may be compared with a total $2^{M-1}$ reference signals (with L=3). The length of the observation interval may correspond with the number of bits in each unique word or, alternatively, to increase accuracy, the observation interval length M may be increased such that the number of symbol or bit periods therein is greater than a number of bits in each unique word. However, in the event that possible reference signals are averaged as set forth above, then the number of reference waveforms N utilized for comparison and, hence, the number of matched filters 52, is some number less than $2^{M-1}$.

Each matched filter 52 has an impulse response $h(t,\alpha_i)$ that corresponds with a particular reference waveform to be compared with the received signal. The set of impulse responses corresponding with the set of differentially encoded data may be expressed as:

$$h(t; \alpha) = \begin{cases} \exp\left(-j\pi \sum_{i=-2}^{M-1} \alpha_i q((M-i)T - t)\right), & 0 \le t < MT \\ 0, & \text{otherwise} \end{cases}$$

Thus, the burst analyzer 30 compares the received signal with each reference waveform by convolving the received signal with the impulse response $h(t,\alpha_i)$ associated with each reference waveform over the observation interval. The convolution results in a correlation value $Z^{(l)}_{M-1}(\epsilon|\alpha_i)$, where l identifies the particular unique word or reference segment 44 and $\epsilon$ represents the time offset from the symbol period T.

Figure 5:
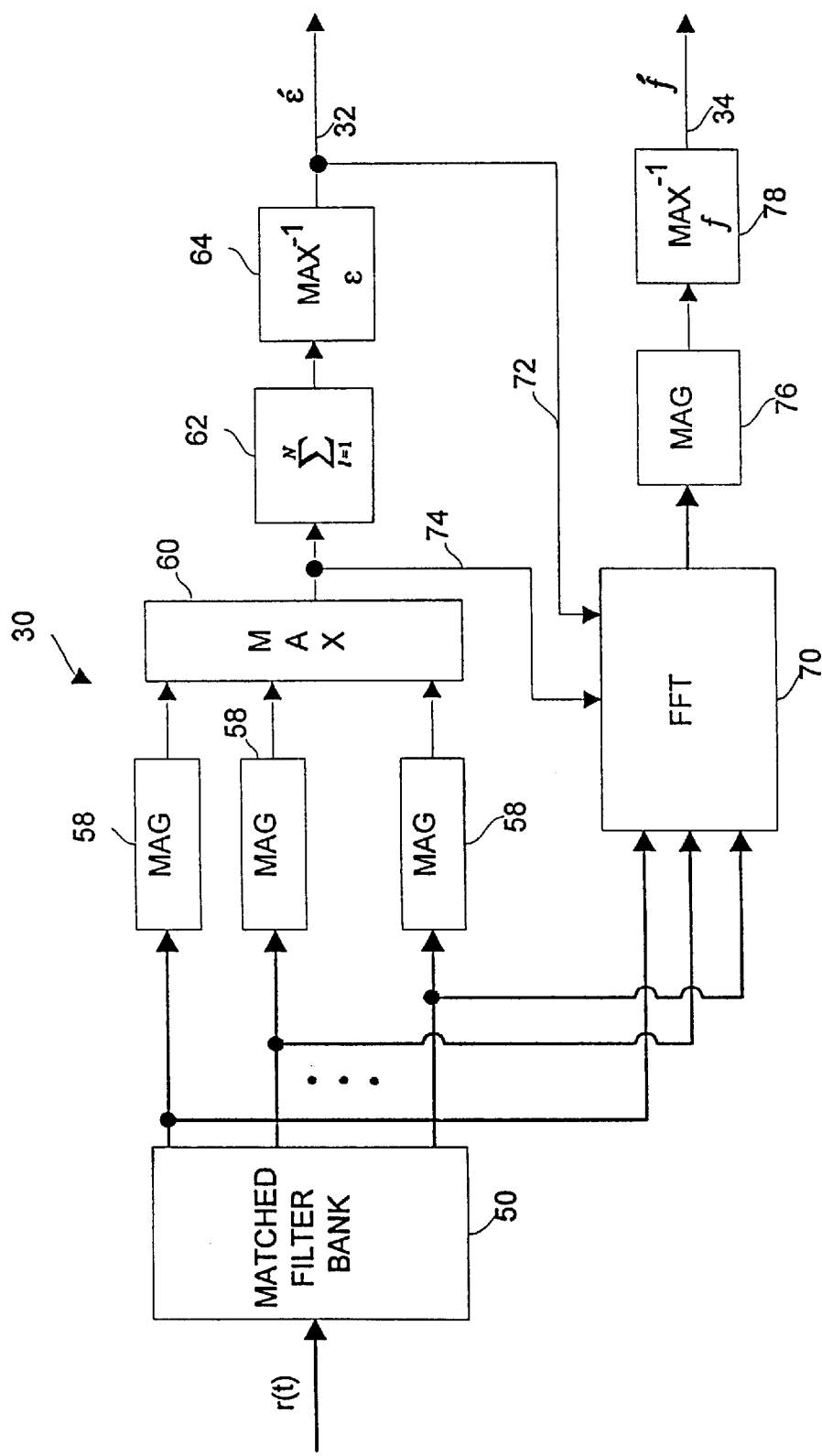
FIG. 5 is a more detailed diagram of a portion of a burst analyzer of the digital communication system of FIG. 1.
Figure 6:
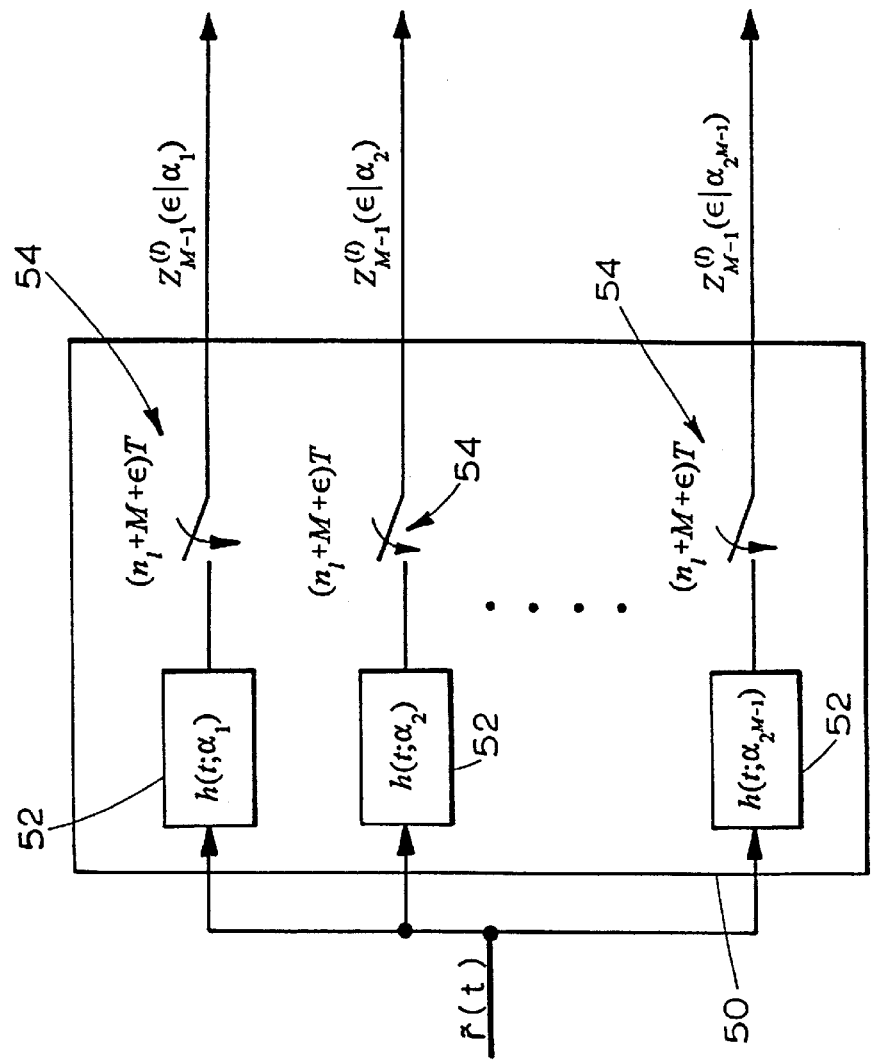
FIG. 6 is a diagram of a matched filter bank for use in the burst analyzer of FIG. 5.

Referring now to both FIGS. 5 and 6, the matched filter bank 50 also includes a plurality of samplers 54 respectively coupled to each matched filter 52. Each sampler 54 samples the output of its corresponding matched filter 52 at a rate equal to $T^{-1}$ at every $(n_l+M+\epsilon)T$, such that the convolution operation may be expressed as:

$$Z_{M-1}^{(l)}(\epsilon|\alpha) = +\tilde{i}\, \tilde{r} + \tilde{i}\,(t)*h(t;\alpha)|_{t=(n_l+M+\epsilon)T}$$

where $n_l$ identifies the location of the l-th unique word or reference segment 44. For example, for the first unique word $UW_1$ shown in FIG. 2, $n_l$ is equal to 18. In this manner, the matched filter bank 50 calculates the convolution of the received signal at $UW_1$ (e.g., from 18T to 21 T, for M=4) with the impulse response associated with a particular reference waveform. As a result of the sampling, a set of the correlation values $Z(\epsilon|\alpha)$ are generated for each reference waveform (as defined by $\alpha_i$) and each time offset $\epsilon$. The above-described correlation calculations are then performed for each reference segment 44, such that $Z(\epsilon|\alpha_i)$ is identified as $Z^{(l)}(\epsilon|\alpha_i)$ in FIGS. 5 and 6 for completeness.

The sets of correlation values $Z(\epsilon|\alpha_i)$ are provided to a plurality of absolute value (or magnitude) generators 58 (FIG. 5) to remove the overall effect of any shift in carrier phase and, therefore, to prepare for the non-coherent combining of the correlation data. Once the magnitude of each of the correlation values has been determined, a maximum correlation value is determined for each reference segment 44 and time offset e by a maximum correlation value determinator 60. For example, for a burst analyzer 30 handling three reference waveforms, the maximum correlation value for the first unique word ($UW_1$) and time offset $\epsilon_1$ would be expressed as:

$$Z^{(1)}_{max}(\epsilon_1) = MAX[|Z^{(1)}(\epsilon_1,\alpha_1)|, |Z^{(1)}(\epsilon_1,\alpha_2)|, |Z^{(1)}(\epsilon_1,\alpha_3)|]$$

The maximum correlation values are stored in a buffer or memory (not shown) as necessary for each time offset and each reference segment 44. Such buffers or memories may be utilized throughout the calculation of the time and frequency offsets and the burst type classification and, therefore, will not be referenced further hereinbelow. It shall be noted that a "maximum correlation value" as used hereinbelow will refer to a correlation value with a maximum magnitude.

As a result of the above-described processing of the correlation data, the correlation data has been modified in preparation for non-coherently combining the correlation data for the entirety of the signal burst 40. Next, the maximum correlation values are provided to a summer or accumulator 62, which sums or otherwise combines the maximum correlation values $Z^{(l)}_{max}$ across the reference segments 44. For the embodiment associated with the signal burst 40 of FIG. 2, the output of the summer 62 may be expressed as the total maximum correlation for a certain time offset $\epsilon_i$:

$$Z_{TOTALmax}(\epsilon_i) = Z^{(1)}_{max}(\epsilon_i) + Z^{(2)}_{max}(\epsilon_i) + \ldots + Z^{(6)}_{max}(\epsilon_i)$$

Because the phase of the received signal is not known a priori, it should be noted that the summer 62 non-coherently combines the correlation statistics over the plurality of unique words or reference segments 44 by summing the magnitudes of the maximum correlation values. This non-coherent combination is also useful in the event that the channel is unknown. It should also be noted that the argument corresponding to the differentially encoded data a is no longer a factor, inasmuch as the correlation data associated with a particular reference waveform having the maximum correlation has already been elected.

Upon determination of each $Z_{TOTALmax}(\epsilon_i)$ for each time offset, the timing offset $\epsilon$ at which the total maximum correlation value $Z_{TOTALmax}(\epsilon_i)$ is a maximum is determined by an inverse maximum value determinator 64. The timing offset $\epsilon$ is then represented by the $t_{SYNCH}$ signal and provided via the line 32 to the demodulator 28 for synchronizing the clock in the demodulator 28 with the signal burst.

The accuracy of the time offset estimation is based on how finely each symbol period T is analyzed (in other words, the granularity of the normalized time offset $\epsilon$), which, in turn, is determined by the sampling rate. For example, a sampling rate resulting in eight samples per symbol period, without more, would limit the resolution of the burst analyzer 30 to a maximum uncertainty of $\pm T/16$. However, the resolution may be improved by interpolating the results between the samples.

More generally, the above-described technique for determining the timing offset $\hat{\epsilon}$ in accordance with the present invention may be expressed as:

$$\hat{\epsilon} = \max_{\epsilon}^{-1} \sum_{l=1}^{N} \max_{j=1,\Lambda,2^{M-1}} |Z_{M-1}^{(l)}(\epsilon|\alpha_j)|$$

where M represents the length of the observation interval. This general representation provides a simple, robust technique for determining the timing offset for a signal burst. This technique can be further justified through the statistical analysis set forth below.

In general, the correlation data generated by the matched filter bank 50 provides a method of accurately estimating the timing offset because the optimal method of estimating the timing offset can be approximated via the convolution process described above. More particularly, the optimal solution is the timing offset that maximizes the likelihood-ratio function averaged over the random phase of the received signal. The likelihood-ratio function essentially compares the received signal with the known reference waveforms as a function of the timing offset. The likelihood of the received signal during the l-th unique word or reference segment 44 having four bits, conditional on knowing the timing offset and the carrier phase, may be expressed as:

$$\Lambda^{(l)}(\tilde{r}(t); (n_l+\epsilon)T \le t < (n_l+4+\epsilon)T | \epsilon, \alpha, \Psi_c) =$$

$$Ce^{-4\frac{E_b}{N_0}} \exp\left(\frac{\sqrt{2S}}{N_0} \operatorname{Re}\{Z_3^{(l)}(\epsilon|\alpha; H_i)e^{-j\Psi_c}\}\right)$$

where:

$$Z_3^{(l)}(\epsilon|\alpha) = \int_{(n_l+\epsilon)T}^{(n_l+4+\epsilon)T} \tilde{r}(t)\exp\left(-j\pi\sum_{i=-2}^{3}\alpha_{n_l+i}q(t-(n_l+i)T-\epsilon T)\right)dt$$

where C is a term independent of the received signal and $\tilde{r}(t)$ is the baseband complex envelope of the received signal. Typically, the phase change due to the frequency term over a unique word interval is small enough that it can be safely absorbed into the initial carrier phase, modifying $\theta_c$ into $\Psi_c$. Averaging over the unknown carrier phase, for which we express the quantity $Z_3^{(l)}(\epsilon|\alpha)$ in complex form as:

$$Z_3^{(l)}(\epsilon|\alpha) = |Z_3^{(l)}(\epsilon|\alpha)|\exp(j\angle Z_3)$$

the resultant averaged likelihood ratio function becomes:

$$\Lambda^{(l)}(\tilde{r}(t); (n_l+\epsilon)T \le t < (n_l+4+\epsilon)T | \epsilon, \alpha) = Ce^{-4\frac{E_b}{N_0}}\frac{1}{2\pi}$$

$$\int_{-\pi}^{\pi} \exp\left(\frac{\sqrt{2S}}{N_0} |Z_3^{(l)}(\epsilon|\alpha)|\cos(\langle Z_3 + \Psi_c)\right)d\Psi_c$$

$$= Ce^{-4\frac{E_b}{N_0}} I_0\left(\frac{\sqrt{2S}}{N_0} |Z_3^{(l)}(\epsilon|\alpha)|\right)$$

where $I_0(x)$ is the zeroth-order modified Bessel function of the first kind. Because the random phase is modeled to be uniformly distributed, the determination of the timing offset will be independent of the carrier phase.

To account for the unknown data bits which contribute to the shape of the reference waveform, the averaged likelihood ratio function is further averaged (over the eight possible reference waveforms), yielding:

$$\Lambda^{(l)}(\tilde{r}(t); (n_l+\epsilon)T \le t < (n_l+4+\epsilon)T | \epsilon) =$$

$$Ce^{-4\frac{E_b}{N_0}}\frac{1}{8}\sum_{j=1}^{8} I_0\left(\frac{\sqrt{2S}}{N_0} |Z_3^{(l)}(\epsilon|\alpha_j)|\right)$$

Because the noise is independent for different unique word intervals, the statistics may be non-coherently combined by multiplying the individual likelihood ratio functions. The optimal solution for the timing offset is, accordingly, the time offset that maximizes the following likelihood function (or its logarithmic version):

$$\hat{\epsilon}_{ML} = \max_{\epsilon}^{-1} \sum_{l=1}^{6} \ln\left[\frac{1}{8}\sum_{j=1}^{8} I_0\left[\frac{\sqrt{2S}}{N_0}|Z_3^{(l)}(\epsilon|\alpha_j)|\right]\right]$$

An embodiment implementing the optimal solution as set forth immediately above would be much more complex than the embodiment set forth above in connection with FIGS. 5 and 6. However, the added complexity would not necessarily provide improved performance, as shown hereinbelow.

The optimal maximum-likelihood expression may be simplified to avoid having to evaluate non-linearities and remove the reliance on the signal and noise levels. Such simplifications are desirable in most mobile satellite communication systems, for instance, because shadowing and fading can considerably vary the gain of the received signal burst. More particularly, certain series approximations may be made, namely, that the average of the different $I_0(x)$ terms will be dominated by the term with the largest argument and that $\ln(I_0(x)) \approx x$ for large x. Such approximations lead to the following simplifications, which remove any dependence on the signal amplitude or strength S, the noise $N_0$, or the non-linearity introduced by the Bessel function $I_0$:

$$\sum_{l=1}^{6} \ln\left[\frac{1}{8}\sum_{j=1}^{8} I_0\left(\frac{\sqrt{2S}}{N_0}|Z_3^{(l)}(\varepsilon|\alpha_j)|\right)\right] \approx \sum_{l=1}^{6} \ln\left[I_0\left(\frac{\sqrt{2S}}{N_0}\max_{j=1,\ldots,8}|Z_3^{(l)}(\varepsilon|\alpha_j)|\right)\right]$$

$$\approx \sum_{l=1}^{6} \frac{\sqrt{2S}}{N_0}\max_{j=1,\ldots,8}|Z_3^{(l)}(\varepsilon|\alpha_j)|$$

$$\propto \sum_{l=1}^{6} \max_{j=1,\ldots,8}|Z_3^{(l)}(\varepsilon|\alpha_j)|$$

As explained above, for performance enhancement, the correlation interval for the matched filter 50 may be extended beyond the number of bits in a reference segment 44. The averaging operation, however, accounts for inter-symbol interference effect caused by the random information bits adjacent the reference segment 44. Thus, as set forth above, the more general expression that extends the correlation interval to M bits and non-coherently combines statistics from the different unique words may be expressed as:

$$\hat{\varepsilon} = \max_{\varepsilon}^{-1} \sum_{l=1}^{N} \max_{j=1,\ldots,2^{M-1}} |Z_{M-1}^{(l)}(\varepsilon|\alpha_j)|$$

where N is the number of unique words or reference segments 44. As described above, the quantity $Z^{(l)}_{M-1}(\epsilon|\alpha)$ may also be expressed as the convolution of the received signal $\tilde{r}(t)$ with a set of filters each having impulse responses matched to the reference waveforms.

With reference again to FIG. 5, the determination of the frequency offset for the signal burst will now be described. Generally, the frequency offset determination is based on both the current time offset $\epsilon$ (determined as set forth above) and the correlation data utilized to generate it. However, before describing the technique for arriving at such a determination, it can be shown that the output of the matched filter bank 50 is a function of the incoming frequency $f_a$. For example, for an AWGN (additive white Gaussian noise) channel, the correlation value $Z^{(l)}_3$ for the l-th unique word is a Gaussian random variable because the matched filter bank 50 comprises a linear operator that preserves the Gaussian characteristics of the received signal. In other words, the correlation value may be expressed as a summation of signal and noise portions:

$$Z_3^{(l)} = Z_{3,s}^{(l)} + Z_{3,n}^{(l)}$$

The noise portion of the correlation value has a mean of zero and a variance that may be shown to be $2N_0(4T)$. It shall be further noted that the noise portions across different reference segments 44 are un-correlated and, therefore, independent, or $$COV\{Z_{3,n}^{(l)}(Z_{3,n}^{(m)})^*\} = \begin{cases} 2N_0(4T), & m=l \\ 0, & \text{otherwise} \end{cases}$$

Once the correct timing offset $\hat{\epsilon}$ has been determined the correct matched filtering operation may be selected for each unique word in the signal burst. The correct matched filter 52 will, in turn, remove the effect of the GMSK modulation, leaving the signal part of the selected correlation values dependent only on the frequency and phase shifts introduced by the channel. In other words, the signal part of the selected correlation values may be expressed as a continuous wave:

$$Z_{3,s}^{(l)} = \sqrt{2S}\int_{n_l T}^{(n_l+4)T} e^{j(2\pi f_a t + \theta_a)} dt$$

$$= \sqrt{2S}\, e^{j\theta_a} \frac{e^{j2\pi f_a(n_l+4)T} - e^{j2\pi f_a n_l T}}{j2\pi f_a}$$

$$= \sqrt{2S}\, 4T \operatorname{sinc}(4f_a T) e^{j2\pi f_a n_l T} e^{j(\theta_a + 4\pi f_a T)}$$

where $\sin c(x) = \sin(\pi x)/\pi x$. By properly rearranging terms, the signal part of the correlation value may be expressed as a single-tone (i.e., a continuous wave) of which we have six samples separated equally by 40T:

$$Z_{3,s}^{(l)} = b_0 e^{j(2\pi f_a(l-1)40T + \theta_0)}; \qquad l=1,2,\ldots,6$$

where the amplitude and phase are defined as:

$$b_0 = \sqrt{2S}\, 4T \sin c(4f_a T)$$

and $$\theta_0 = \theta_a + 2\pi f_a(20T)$$

Typically, the incoming frequency falls within a range such that $4f_a T \ll 1$ and, thus, the amplitude may be approximated as:

$$b_0 \approx \sqrt{2S}\, 4T$$

which is independent of the incoming frequency $f_a$.

In summary for the embodiment described above, the matched filter bank 50 transforms a GMSK signal burst having six unique words into a set of six samples of a continuous wave spanning the 240 bit signal burst. Those samples are taken uniformly at a rate of $(40T)^{-1}$ Hz:

$$Z_3^{(l)} = b_0 \exp\left(j\left(2\pi f_a \frac{(l-1)}{B} + \theta_0\right)\right) + Z_{3,n}^{(l)}; \quad l=1,2,\ldots,N$$

It shall be noted that the uniform distribution of the unique words over the signal burst is not necessary for determination of the frequency (or the timing) of the signal burst 40. Moreover, the exact locations of the unique words within the signal burst are also not crucial, as the burst analyzer 30 will be aware of the general locations of the unique words. However, the distributed nature of the unique words does provide more meaningful sample data.

As shown in FIG. 5, the correlation values generated by the matched filter bank 50 are provided to a discrete-time Fourier transformer 70, which may implement a Fast Fourier Transform (FFT) algorithm. The Fourier transformer 70 is coupled to each of the matched filters 52 and then elects particular correlation values depending on the current timing offset $\hat{\epsilon}$ and the maximum correlation values provided on lines 72 and 74, respectively. Knowing that the correlation data from the matched filter bank 50 (for the correct timing offset and correct reference waveform) provides a plurality of samples of a continuous wave, the frequency of that wave can be determined from the frequency domain distribution generated from the Fourier transform operation. The frequency domain distribution is provided to an absolute value or magnitude generator 76, which, in turn, may provide the magnitude of the frequency domain distribution to a memory (not shown). That same memory may also be utilized by the Fourier transformer 70 to analyze the correlation data. The memory may collect data representative of the frequency domain distribution of the correlation data for a predetermined time period, and then an inverse maximum value determinator 78 analyzes the data to determine the frequency $f_a$ at which the magnitude of the frequency domain distribution is a maximum. To this end, the inverse maximum value determinator 78 generates a signal equal to, or representative of, the $f_{OFFSET}$ signal on the line 34.

The above-described technique for determining the actual frequency $f_a$ of the incoming signal burst may be further justified via statistical analysis based on the optimal likelihood-ratio function. The likelihood function at the output of the matched filter bank 50 may be written as:

$$\Lambda(Z_3^{(l)}; l = 1, 2, \ldots, N \mid b_0, f, \theta_0) =$$

$$Ce^{-4\frac{E_b}{N_0}} \exp\left\{\frac{b_0}{N_0(4T)} \text{Re}\left\{\left[\sum_{l=1}^{N} Z_3^{(l)} e^{-j2\pi f \frac{(l-1)}{B}}\right] e^{-j\theta_0}\right\}\right\}$$

where C is a term independent of the received signal. Because the phase of the received signal is unknown, the likelihood must be averaged over the random phase, for which we express the quantity $Z^{(l)}_3$ in complex form as set forth above. The resultant averaged likelihood-ratio function becomes:

$$\Lambda(Z_3^{(l)}; l = 1, 2, \ldots, N \mid b_0, f, \theta_0) = Ce^{-4\frac{E_b}{N_0}} \frac{1}{2\pi} \int_{-\pi}^{\pi} \exp\left(\frac{b_0}{N_0(4T)}\right.$$

$$\left|\sum_{l=1}^{N} Z_3^{(l)} e^{-j2\pi f \frac{(l-1)}{B}}\right| \cos(\langle Z_3 + \theta_0\rangle)\right) d\theta_0$$

$$= Ce^{-4\frac{E_b}{N_0}} I_0\left(\frac{b_0}{N_0(4T)} \left|\sum_{l=1}^{N} Z_3^{(l)} e^{-j2\pi f \frac{(l-1)}{B}}\right|\right)$$

The estimate of the frequency under the unknown phase condition is the value at which the likelihood is maximized:

$$f_{ML} = \max_{f}{}^{-1} I_0\left(\frac{b_0}{N_0(4T)} \left|\sum_{l=1}^{N} Z_3^{(l)} e^{-j2\pi f \frac{(l-1)}{B}}\right|\right)$$

$$= \max_{f}{}^{-1} \left|\sum_{l=1}^{N} Z_3^{(l)} e^{-j2\pi f \frac{(l-1)}{B}}\right|$$

Figure 7:
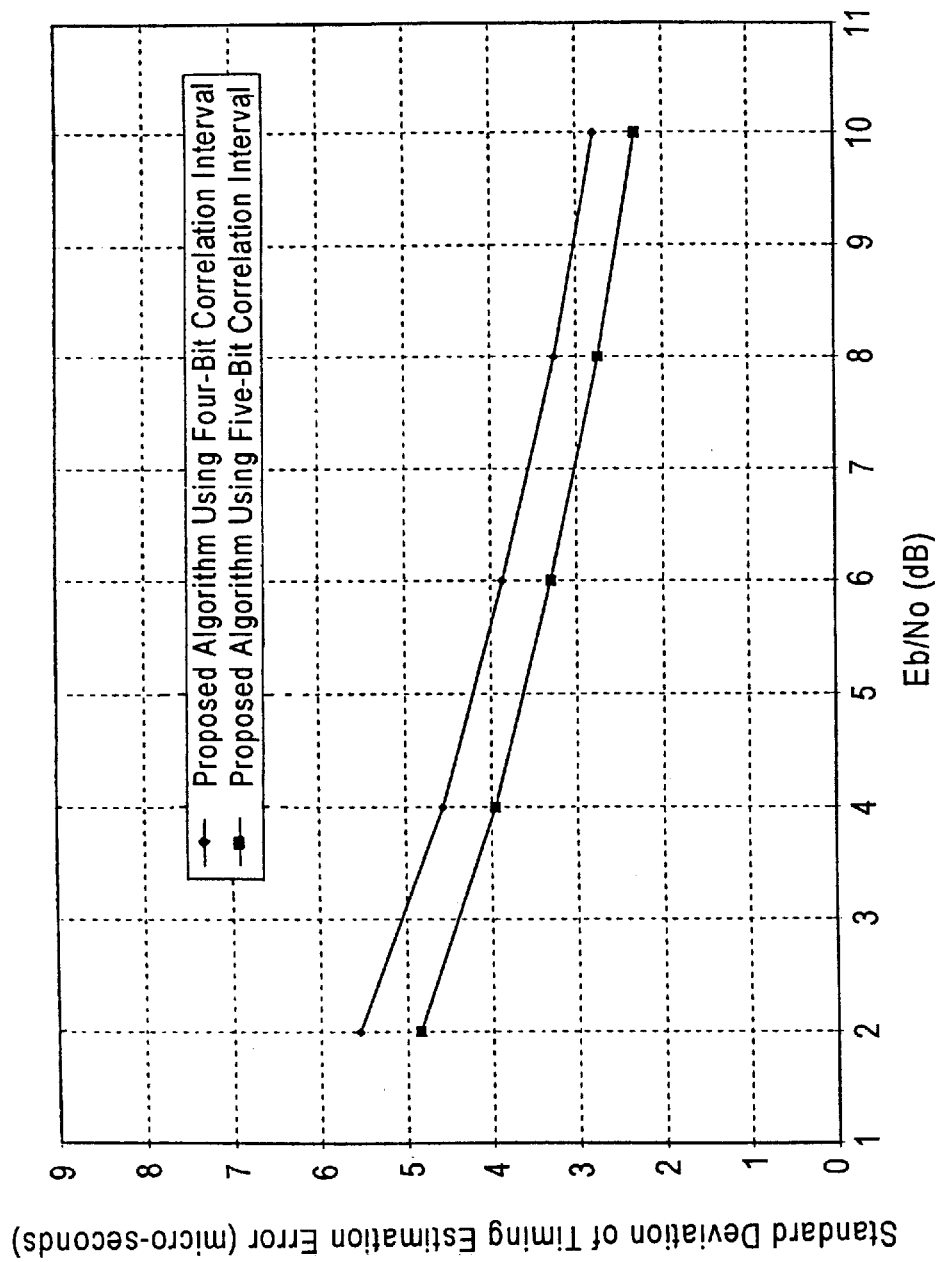
FIG. 7 is a chart plotting the timing estimation performance of two different embodiments of the burst analyzer of FIG. 5.
Figure 8:
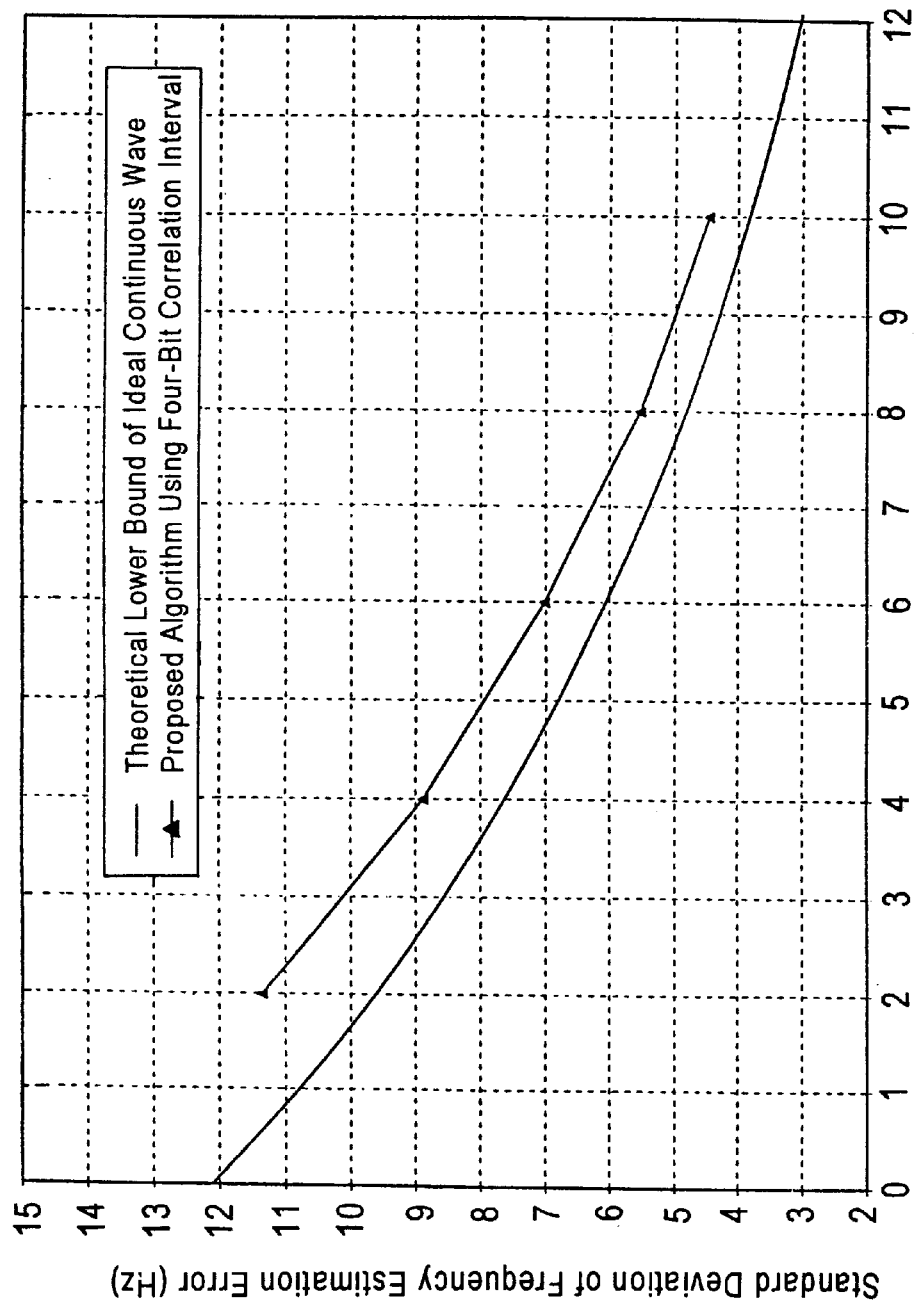
FIG. 8 is a chart plotting the frequency estimation performance of the burst analyzer of FIG. 5.

A closer look at the likelihood function to be maximized reveals that it is the magnitude of the discrete-time Fourier transform (DFT) evaluated at the frequencies to be tested. The DFT may be expressed as:

$$DFT(f) = \sum_{l=1}^{N} Z_3^{(l)} e^{-j2\pi f \frac{(l-1)}{B}}$$

where the discrete-time points are sampled at a rate B (Hz). While the frequency determination is not limited to the manner in which the DFT is implemented, well-known procedures for performing a fast fourier transform (FFT) are computationally efficient. Such procedures may be advantageous for extending the observation interval to M bits (as set forth above in connection with the timing offset determination), such that the carrier frequency estimate becomes:

$$\hat{f} = \max_{f}{}^{-1} \left|\sum_{l=1}^{N} Z_{M-1}^{(l)} e^{-j2\pi f \frac{(l-1)}{B}}\right|$$

where the correlation values Z are selected from the set of correlation values based on the signals on the lines 72 and 74. As was the case in connection with the timing offset determination, performance has been shown to improve with M larger than four (the number of bits in an unique word). With reference now to FIGS. 7 and 8, the performance of the burst analyzer 30 for joint determination of timing and frequency offsets is shown in terms of estimation error. The amount of error is presented as the standard deviation of the estimation error as a function of the signal energy per bit to noise power spectral density $E_b/N_0$ of the received waveform. For the purposes of evaluation only, the timing uncertainty was set to ±14 microseconds and the frequency was set to ±200 Hz.

FIG. 7 shows the timing synchronization performance when using four- and five-bit correlation intervals. The five-bit correlation interval embodiment provides about 1.5 dB of gain in required input signal to noise ratio (SNR) over the four-bit embodiment (for a fixed amount of estimation error). Thus, the extension of the correlation interval provides significant performance improvements. Further, bandwidth-efficient systems that can only assign a small number of reference bits will benefit greatly from that particular embodiment. Despite these improvements, it shall be noted that the burst analyzer 30 is not limited to embodiments that extend the correlation interval beyond what has been assigned as reference information, and certainly not to an embodiment utilizing a four- or five-bit correlation interval.

As shown hereinabove, the performance of the burst analyzer 30 for the frequency offset determination depends on the accuracy of the timing synchronization. As shown in FIG. 8, performance of the burst analyzer 30 with the timing uncertainty set to ±14 microseconds is quite comparable to the theoretical lower bound of a continuous wave (i.e., perfect timing conditions). The ideal situation may be expressed as a function of $E_b/N_0$ as follows:

$$\sigma_{LB} = \sqrt{\frac{3}{8\pi^2} \frac{N}{N^2-1}} \left(\frac{E_b}{N_0}\right)^{-1/2} (N\_bits\,T)^{-1}$$

where N_bits is the number of bits in the signal burst. The performance data shown in FIG. 8 evaluated a 240 bit signal burst embodiment, with four-bit unique words and a four-bit correlation interval. Improvements may be obtained by increasing the correlation interval.

As shown in FIGS. 7 and 8 and set forth above, the burst analyzer 30 provides accurate determinations of both the timing and frequency of a signal burst in a feed forward manner (i.e., no feedback necessary). However, in certain applications requiring even greater accuracy, the estimation error may be further improved by providing a closed loop system incorporating the burst analyzer 30, a memory (not shown), and a processor (not shown) for providing tracking over different signal bursts.

The above-described burst analyzer 30 is the subject of a co-pending application filed concurrently herewith and entitled "Method and Apparatus for Joint Timing Synchronization and Frequency Offset Estimation." The burst classification method and apparatus of the present invention may be advantageously utilized in a digital communication system incorporating the burst analyzer 30 and, thus, has been described in connection therewith. However, it shall be understood that application of the present invention is not limited to use with the burst analyzer 30 of the digital communication system 20 described above.

Generally, the method and apparatus of the present invention provides a mechanism for classifying incoming signal bursts in digital communication systems that assign reference symbols. Burst type classification according to the present invention is performed non-coherently and, accordingly, does not require knowledge of the timing of the burst, the carrier phase, or the carrier frequency offset. Furthermore, compensation for unknown channel conditions is not necessary.

Figure 9:
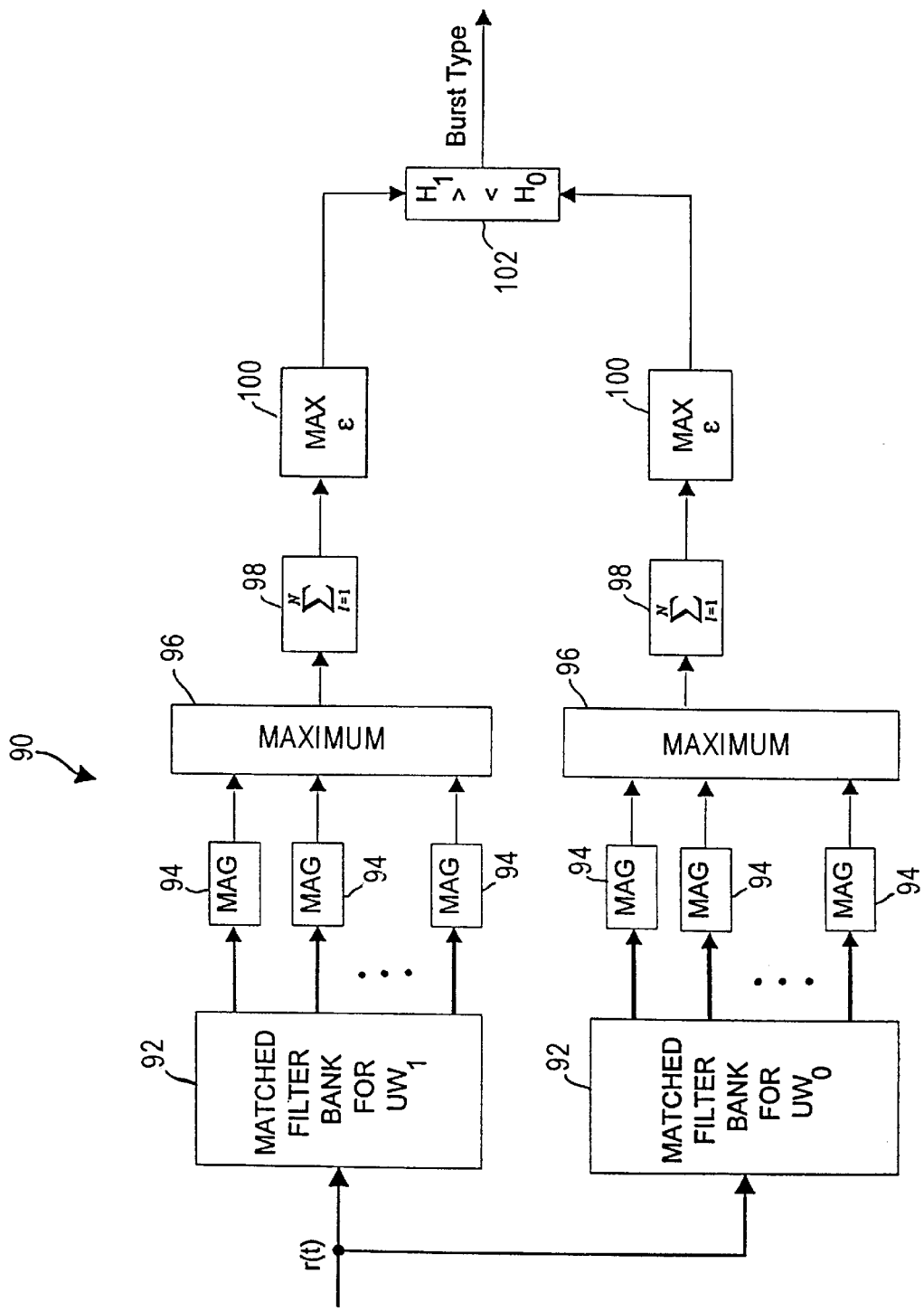
FIG. 9 is a more detailed diagram of another portion of the burst analyzer according to one embodiment of the present invention.

With reference now to FIG. 9, the received signal is also provided to a burst classifier 90 in accordance with the present invention. The burst classifier 90 may be incorporated into the burst analyzer 30 of FIG. 1, but alternatively may constitute a stand-alone component of the receiving portion of the digital communication system 20. The burst classifier 90 includes multiple matched filter banks 92, each of which is coupled to the front end filter 26 (FIG. 1) to be provided with the received signal. In accordance with one embodiment of the present invention, the matched filter bank 50 (FIG. 5) of the burst analyzer 30 constitutes one of the matched filter banks 92. As will be evident from the description to follow, the processing according to one embodiment of the present invention for burst type classification overlaps to great extent with the above-described processing necessary for timing and frequency estimation. Regardless of whether such efficiencies are realized, each matched filter bank 92 processes the received signal in the same manner as set forth in FIG. 6 and described above.

In the embodiment shown in FIG. 9, two matched filter banks 92 are provided for two different unique words, $UW_0$ and $UW_1$, respectively. In general, a corresponding matched filter bank 92 is provided for each possible burst type. In this manner, each burst type may have one or more distinct unique words assigned thereto for identification purposes and are assumed to be different for different burst types. For example, the unique word (−1, −1, 1, − 1) of the TCH burst 40 of FIG. 2 may constitute $UW_0$, while $UW_1$ signifies a FACCH or other burst type. Thus, in the embodiment shown in FIG. 9, $UW_0$ and $UW_1$ are not to be confused with different unique words in a single signal burst, but rather each constitutes a unique word assigned to identify a particular burst type.

As set forth in connection with FIG. 6, each matched filter bank 92 comprises a plurality of filters matched to the possible reference waveforms representative of the unique words, along with averages thereof, if desired. If more than one unique word has been associated with a particular burst type such that the burst includes different unique words in the reference segments 44 thereof, the plurality of filters must also accommodate the reference waveforms associated therewith.

The filters of each matched filter bank 92 compare the received signal with each of the reference waveforms thereof over an observation or correlation interval in the manner described above in connection with the burst analyzer 30. The observation interval may be extended beyond that which is assigned as reference bits, thereby increasing the number of reference waveforms from, for example, eight to sixteen (unless suitable averaging is utilized to reduce complexity). Improvements in burst classification similar to those exhibited in connection with the timing and frequency determinations would result from such an extension.

For each reference waveform to be tested, the respective filter of the matched filter bank 92 has an impulse response $h(t,\alpha_i)$ that corresponds with the reference waveform. The impulse response is based on the differentially encoded data of the unique word as set forth above in connection with the matched filters 52 of the burst analyzer 30 and, therefore, will not be further explained here.

In summary, the matched filter banks 92 of the burst classifier 90 compare the received signal with each reference waveform (offset by a plurality of time offsets) associated with each possible burst type, respectively, by convolving the received signal with each respective impulse response over the observation interval. The convolution results in correlation data represented by the same type of correlation values $Z^{(l)}_{M-1}(\epsilon|\alpha_i)$ generated in connection with the burst analyzer 30. It shall be noted that the discrete correlation values are generated by a plurality of samplers (see FIG. 6 and the corresponding description) coupled to each filter in each matched filter bank 92.

With continued reference to FIG. 9, the correlation data for each matched filter bank 92 is provided to a plurality of absolute value (or magnitude) generators 94. Of course, the magnitude generators 94 may be "shared" by the matched filter banks 92 to avoid unnecessary system complexity through suitable programming. Once the magnitude of each correlation value has been generated, a maximum correlation value $Z^{(l)}_{max}(\epsilon_i)$ is determined for each reference segment 44 (see FIG. 2) and time offset $\epsilon$ by a maximum correlation value determinator 96. Once again, the burst classifier 96 may include a plurality of such determinators 96, each being dedicated to a particular matched filter bank 92 or, alternatively, include a single, shared software routine, for example, that is accessed when necessary for each set of correlation values.

As further explained above in connection with the burst analyzer 30, the correlation data associated with each possible burst type has been modified in preparation for non-coherently combining the correlation data for the entirety of the signal burst. Accordingly, the maximum correlation values are provided to a summer or accumulator 98, which sums or otherwise combines the maximum correlation values across the reference segments of the signal burst to generate a total maximum correlation $Z_{TOTALmax}(\epsilon_i)$ for each respective time offset.

the unknowns) wherein a particular burst type is declared whenever a threshold is exceeded, or $$\frac{<<\,<<\Lambda(\tilde{r}(t)\,|\,\alpha_1,\varepsilon_1,f_1,\theta_1;H_1)>_{\alpha_1}>_{\varepsilon_1}>_{f_1}>_{\theta_1}}{<<\,<<\Lambda(\tilde{r}(t)\,|\,\alpha_0,\varepsilon_0,f_0,\theta_0;H_0)>_{\alpha_0}>_{\varepsilon_0}>_{f_0}>_{\theta_0}} \overset{H_1}{\underset{H_0}{\gtrless}} \frac{P(H_0)}{P(H_1)} = \text{Threshold}$$

Instead of finding the time offset at which the output of the summer 98 is a maximum, which would result in a timing offset value for the signal burst as set forth above, the burst classifier 90 includes a maximum value determinator 100 that finds the maximum $Z_{TOTALmax}(\epsilon_i)$ across all possible time offsets. The processing resulting in this collective maximum correlation for each burst type has, thus, removed the uncertainty associated with the unknown timing variable. These collective maximum correlations for all of the burst types are then supplied to a comparator 102 that elects the burst type having the most correlation with the received signal. Alternatively, the comparator 102 may be implemented as an inverse maximum operator over the hypothesis index.

In the embodiment of FIG. 9, only two possible burst types exist, each of which is represented by a single unique word ($UW_0$ or $UW_1$). However, it shall be understood that the comparator 102 may handle compare as many different inputs as necessary. In this manner, the burst classifier 90 may classify the incoming burst according to any number of different burst types transmitted in the digital communication system 20.

A comparison of FIGS. 5 and 9 will yield that, with the exception of the maximum value determinator 100 and the comparator 102, the components of the burst analyzer 30 and the burst classifier 90 coincide to a great extent. As a result, the processing leading to timing and frequency determinations for a particular signal burst may be performed simultaneously with the burst type classification. Such dual processing will reduce processing time without adding extensive amounts of system complexity. Therefore, in some embodiments of the present invention, the timing and frequency offsets of a signal burst may be quickly and easily generated subsequent to burst type classification.

As a further result of this overlap, the burst classifier 90 may be embodied as a portion of the burst analyzer 30 (or vice versa). However, the burst classifier 90, in general, may be implemented in any component of the receiving portion of the digital communication system 20 that is supplied with the received signal.

The above-described method and apparatus for burst type classification may be justified via statistical analysis based on the likelihood-ratio function averaged over the unknown parameters (e.g., timing). For a two type case such as the one described above, the optimal classification rule may be expressed as a ratio of likelihood functions (averaged over where $<.>$ denotes the statistical average over the random variable, $H_i$ is the hypothesis that the burst is the i-th type, and $P(H_i)$ is the probability of occurrence of the i-th hypothesis. Because it can be assumed that the hypotheses are equally likely, the threshold may be set to unity. Other values of the threshold are possible.

Based on knowing that the system 20 assigns different unique words for different burst types, the likelihood function for the received signal during the I-th unique word conditional on knowing the timing offset and the carrier phase under the i-th hypothesis may be expressed as:

$$\Lambda^{(l)}(\tilde{r}(t); (n_l+\varepsilon)T \le t < (n_l+4+\varepsilon)T \,|\, \varepsilon,\alpha,\Psi_c;H_i) =$$
$$Ce^{-4\frac{E_b}{N_0}}\exp\left(\frac{\sqrt{2S}}{N_0}\operatorname{Re}\{Z_3^{(l)}(\varepsilon\,|\,\alpha;H_i)e^{-j\Psi_c}\}\right)$$

where $$Z_3^{(l)}(\varepsilon\,|\,\alpha;H_i) = \int_{(n_l+\varepsilon)T}^{(n_l+4+\varepsilon)T} \tilde{r}(t)\exp\left(-j\pi\sum_{j=-2}^{3}\alpha_{n_l+j,H_i}q(t-(n_l+j)T-\varepsilon T)\right)dt$$

and where C is a term independent of the transmitted signal and r(t) is the baseband complex envelope of the received waveform (i.e., the received signal).

For non-coherent burst type classification (so that the technique does not require additional processing to estimate the carrier phase), the likelihood function is averaged over the random phase, for which we express the quantity $Z^{(l)}_{M-1}(\epsilon|\alpha;H_i)$ in complex form as:

$$Z_3^{(l)}(\epsilon|\alpha;H_i) = |Z_3^{(l)}(\epsilon|\alpha;H_i)|\exp(jZ_3)$$

The resultant averaged likelihood ratio becomes $$\Lambda^{(l)}(\tilde{r}(t); (n_l+\varepsilon)T \le t < (n_l+4+\varepsilon)T \,|\, \varepsilon,\alpha;H_i) = Ce^{-4\frac{E_b}{N_0}}\frac{1}{2\pi}$$
$$\int_{-\pi}^{\pi}\exp\left(\frac{\sqrt{2S}}{N_0}|Z_3^{(l)}(\varepsilon\,|\,\alpha;H_i)|\cos(\langle Z_3+\Psi_c\rangle)\right)d\Psi_c$$
$$= Ce^{-4\frac{E_b}{N_0}}I_0\left(\frac{\sqrt{2S}}{N_0}|Z_3^{(l)}(\varepsilon\,|\,\alpha;H_i)|\right)$$

where $I_0(x)$ is the zeroth order Bessel function of the first kind. Because the random phase is modeled to be uniformly distributed, the performance of the present invention is independent of the carrier phase parameter.

To account for the unknown data bits which contribute to the shape of the reference waveform, the averaged likelihood ratio function is further averaged (over the eight possible waveforms), yielding:

$$\Lambda^{(l)}(\tilde{r}(t); (n_l + \varepsilon)T \le t < (n_l + 4 + \varepsilon)T \mid \varepsilon; H_i) =$$

$$Ce^{-4\frac{E_b}{N_0}} \frac{1}{8} \sum_{j=1}^{8} I_0\left(\frac{\sqrt{2S}}{N_0} |Z_3^{(l)}(\varepsilon \mid \alpha_j; H_i)|\right)$$

Because the noise is independent for different unique word intervals, the statistics may be non-coherently combined by multiplying the individual likelihood ratio functions. The optimal classification rule may then be expressed as $$\int \exp\left[\sum_{l=1}^{6} \ln\left(\frac{1}{8} \sum_{j=1}^{8} I_0\left(\frac{\sqrt{2S}}{N_0} |Z_3^{(l)}(\varepsilon_1 \mid \alpha_j, H_1)|\right)\right)\right] d\varepsilon_1 \mathop{\gtrless}_{H_0}^{H_1}$$

$$\int \exp\left[\sum_{l=1}^{6} \ln\left(\frac{1}{8} \sum_{j=1}^{8} I_0\left(\frac{\sqrt{2S}}{N_0} |Z_3^{(l)}(\varepsilon_0 \mid \alpha_j, H_0)|\right)\right)\right] d\varepsilon_0$$

A simplified rule may then be derived using the same high SNR approximations set forth above in connection with the burst analyzer 30, thereby eliminating the non-linearities and removing any dependence on the signal amplitude. These approximations, together with a replacement of the averaging operation with the maximum operation, which is acceptable under high SNR conditions, are set forth below:

$$\sum_{l=1}^{6} \ln\left[\sum_{j=1}^{8} I_0\left(\frac{\sqrt{2S}}{N_0} |Z_3^{(l)}(\varepsilon \mid \alpha_j; H_i)|\right)\right] \approx \sum_{l=1}^{6} \ln\left[I_0\left(\frac{\sqrt{2S}}{N_0} \max_{j=1,\ldots,8} |Z_3^{(l)}(\varepsilon \mid \alpha_j; H_i)|\right)\right]$$

$$\approx \sum_{l=1}^{6} \frac{\sqrt{2S}}{N_0} \max_{j=1,\ldots,8} |Z_3^{(l)}(\varepsilon \mid \alpha_j; H_i)|$$

$$\propto \sum_{l=1}^{6} \max_{j=1,\ldots,8} |Z_3^{(l)}(\varepsilon \mid \alpha_j; H_i)|$$

After some algebraic manipulations, the simplified classification rule (or its logarithmic version) for the two type case may be expressed as:

$$\max_{\varepsilon_1} \sum_{l=1}^{6} \max_{j=1,\ldots,8} |Z_3^{(l)}(\varepsilon_1 \mid \alpha_j, H_1)| \mathop{\gtrless}_{H_0}^{H_1} \max_{\varepsilon_0} \sum_{l=1}^{6} \max_{j=1,\ldots,8} |Z_3^{(l)}(\varepsilon_0 \mid \alpha_j, H_0)|$$

Once again, it shall be noted that the present invention is not limited to a system having only two types of signal bursts, inasmuch as the above principles may be extended to cover as many different burst types as necessary.

The performance of the present invention may be evaluated in terms of the probability of making the correct decision, P(C), or $$P(C) = \frac{P(C \mid H_1) + P(C \mid H_0)}{2}$$

for equally likely hypotheses. Using computer simulations of the Monte-Carlo type, the burst classifier 90 of the present invention exhibited a probability of making incorrect decisions of merely 0.018%. The simulation was run for $E_b/N_0=2$ dB and 50,000 bursts for high statistical reliability in an AWGN channel with the same induced timing and frequency uncertainties as utilized above in connection with the performance testing of the burst analyzer 30.

The burst classifier 90 is not limited to application in an AWGN (additive white Gaussian noise) channel. The burst classifier 90 has exhibited a high degree of robustness in other environments frequently encountered in mobile satellite communications including, for example, Rician fading channels that are moderately or severely frequency-selective channels.

The method and apparatus according to the present invention may also be implemented in a variety of ways. The steps of the inventive method may be carried out by a general purpose processor programmed with software routine(s) in accordance with the present invention. Alternatively, the general purpose processor may be replaced with a digital signal processor in the form of an ASIC or other specialized IC designed to perform the steps of the inventive method. It shall be understood that, regardless of the hardware utilized, the present invention may be implemented using any combination of hardware, software, and firmware.

Numerous other modifications and alternative embodiments of the invention will be apparent to those skilled in the art in view of the foregoing description. Accordingly, this description is to be construed as illustrative only. The details of the structure and method may be varied substantially without departing from the spirit of the invention, and the exclusive use of all modifications which are within the scope of the appending claims is reserved.

What is claimed is:

1. A burst classifier for use in a digital communication system transmitting a signal burst of a plurality of different burst types, the burst classifier comprising:

a plurality of filters associated with the plurality of different burst types, respectively, wherein each filter generates correlation data based on the signal burst and a respective plurality of reference signals offset by a plurality of time offsets, the respective pluralities of reference signals being indicative of a corresponding burst type of the plurality of different burst types; and a comparator that analyzes quantities based on the correlation data from each filter to determine the burst type of the signal burst.

2. The burst classifier of claim 1, further comprising a plurality of accumulators that respectively combine values based on the correlation data generated by each filter for a plurality of reference segments distributed within the signal burst.

3. The burst classifier of claim 2, further comprising means coupled to the filters for modifying the correlation data such that the accumulators perform a non-coherent combination.

4. The burst classifier of claim 2, wherein the accumulator comprises a summer that sums the values based on the correlation data to generate a correlation sum for each time offset.

5. The burst classifier of claim 4, further comprising:
first means for determining, for each reference segment of the signal burst, a maximum correlation value from the correlation data for each time offset; and
second means for determining a maximum correlation sum from the correlation sums for each time offset.

6. The burst classifier of claim 1, wherein the signal burst is modulated according to a memory-inducing modulation scheme.

7. The burst classifier of claim 1, wherein the signal burst comprises a plurality of reference segments distributed therein.

8. The burst classifier of claim 7, wherein each of the reference segments of the signal burst comprises an identical unique word modulated according to a memory-inducing modulation scheme.

9. The burst classifier of claim 7, wherein each filter compares the signal burst and the respective plurality of reference signals over a correlation interval spanning a time period corresponding to the length of each reference segment.

10. The burst classifier of claim 7, wherein each filter compares the signal burst and the respective plurality of reference signals over a correlation interval spanning a time period greater than the length of each reference segment.

11. The burst classifier of claim 7, wherein:
each reference segment comprises a unique word; and
at least one of the reference signals is representative of an average of a plurality of possible signals representative of the unique word subsequent to modulation.

12. The burst classifier of claim 1, wherein the signal burst comprises a GMSK-modulated signal.

13. The burst classifier of claim 1, wherein each filter comprises:
a plurality of matched filters wherein each matched filter has an impulse response matched to a corresponding reference signal of the respective plurality of reference signals such that each matched filter generates a convolution signal representative of the convolution of the signal burst and the respective impulse response matched to a corresponding reference signal; and
a plurality of samplers coupled to the plurality of matched filters that sample the convolution signals at a rate commensurate with a bit transmission rate for the signal burst.

14. The burst classifier of claim 13, further comprising:
a plurality of absolute value generators coupled to each matched filter; and
a plurality of means coupled to the respective absolute value generators for determining maximum correlation data for each time offset.

15. A method of classifying a signal burst as one of a plurality of burst types transmitted in a digital communication system, the method comprising the steps of:
(a) calculating correlation data based on the signal burst and a respective plurality of reference signals offset by a plurality of time offsets, the respective pluralities of reference signals being indicative of a corresponding burst type of the plurality of different burst types; and
(b) comparing quantities based on the correlation data to determine the burst type of the signal burst.

16. The method of claim 15, further comprising the step of combining non-coherently values based on the correlation data across a plurality of reference segments distributed within the signal burst to generate a correlation sum for each time offset.

17. The method of claim 16, further comprising the step of finding a maximum correlation sum from the correlation sums to remove uncertainty based on an unknown timing of the signal burst.

18. The method of claim 17, further comprising the step of preparing the correlation data for non-coherent combination.

19. The method of claim 16, further comprising the steps of:
determining, for each reference segment of the signal burst, a maximum correlation value from the correlation data for each time offset; and
determining a maximum correlation sum from the correlation sums for each time offset.

20. The method of claim 15, wherein the signal burst is modulated according to a memory-inducing modulation scheme.

21. The method of claim 15, wherein the signal burst comprises a plurality of reference segments distributed therein.

22. The method of claim 21, wherein each of the reference segments of the signal burst comprises an identical unique word modulated according to a memory-inducing modulation scheme.

23. The method of claim 21, wherein step (a) comprises the step of comparing the signal burst and the respective plurality of reference signals over a correlation interval spanning a time period corresponding to the length of each reference segment.

24. The method of claim 21, wherein step (a) comprises the step of comparing the signal burst and the respective plurality of reference signals over a correlation interval spanning a time period greater than the length of each reference segment.

25. The method of claim 21, wherein:
each reference segment comprises a unique word; and
at least one of the reference signals is representative of an average of a plurality of possible signals representative of the unique word subsequent to modulation.

26. The method of claim 15, wherein the signal burst comprises a GMSK-modulated signal.

27. The method of claim 15, wherein step (a) comprises the steps of:
convolving the signal burst with filters having respective impulse responses matched to a corresponding reference signal of the respective plurality of reference signals to generate respective convolution signals; and
sampling the convolution signals at a rate commensurate with a bit transmission rate for the signal burst to generate respective sampled convolution signals.

28. The method of claim 27, further comprising the steps of:
generating an absolute value of the sampled convolution signals; and
determining maximum correlation data for each time offset from the absolute value of the sampled convolution signals.

29. A method of classifying a signal burst modulated by a modulation scheme that induces memory therein as one of a plurality of burst types transmitted in a digital communication system, the method comprising the steps of:

comparing the signal burst with a respective plurality of reference signals to generate comparison data not reflecting the memory induced by the modulation scheme wherein the respective pluralities of reference signals are indicative of a corresponding burst type of the plurality of different burst types; and combining the comparison data non-coherently over a plurality of reference segments distributed within the signal burst to generate combined comparison data for each of a plurality of time offsets and for each burst type;

removing uncertainty associated with a timing offset of the signal burst by generating a maximum comparison value for each burst type from the combined comparison data for the plurality of time offsets; and determining the burst type of the signal burst from the maximum comparison values.

30. The method of claim 29, wherein step (a) is performed, for each reference segment, over an observation interval spanning a time period greater than the length of each reference segment.

* * * * *